United States Patent
Wang et al.

(10) Patent No.: US 9,834,827 B2
(45) Date of Patent: Dec. 5, 2017

(54) METHOD AND APPARATUS FOR RECYCLING LITHIUM-ION BATTERIES

(71) Applicants: Yan Wang, Shrewsbury, MA (US); Diran Apelian, West Boylston, MA (US); Haiyang Zou, Zhuhai (CN)

(72) Inventors: Yan Wang, Shrewsbury, MA (US); Diran Apelian, West Boylston, MA (US); Haiyang Zou, Zhuhai (CN)

(73) Assignee: Worcester Polytechnic Institute, Worcester, MA (US)

( * ) Notice: Subject to any disclaimer, the term of this patent is extended or adjusted under 35 U.S.C. 154(b) by 186 days.

(21) Appl. No.: 13/855,994

(22) Filed: Apr. 3, 2013

(65) Prior Publication Data

US 2013/0302226 A1 Nov. 14, 2013

Related U.S. Application Data

(60) Provisional application No. 61/620,051, filed on Apr. 4, 2012.

(51) Int. Cl.

| | |
|---|---|
| C22B 47/00 | (2006.01) |
| H01M 4/52 | (2010.01) |
| C22B 3/02 | (2006.01) |
| C22B 7/00 | (2006.01) |
| H01M 4/505 | (2010.01) |
| H01M 4/525 | (2010.01) |
| H01M 10/54 | (2006.01) |

(52) U.S. Cl.
CPC ........... *C22B 47/00* (2013.01); *C22B 3/02* (2013.01); *C22B 7/006* (2013.01); *H01M 4/505* (2013.01); *H01M 4/52* (2013.01); *H01M 4/525* (2013.01); *H01M 10/54* (2013.01); *Y02P 10/234* (2015.11); *Y02W 30/84* (2015.05)

(58) Field of Classification Search
CPC ........... C22B 3/02; C22B 47/00; C22B 7/006; H01M 10/54; H01M 4/505; H01M 4/525; H01M 4/52
USPC ............................................. 423/50; 429/49
See application file for complete search history.

(56) References Cited

U.S. PATENT DOCUMENTS 6,261,712 B1* 7/2001 Hayashi et al. ................ 429/49

FOREIGN PATENT DOCUMENTS

CN 10-1450815 * 6/2009

OTHER PUBLICATIONS

Translation of CN 10-1450815, Jun. 2009.*
M.B.J.G.Freitas, E.M.Garcia, Electrochemical recycling of cobalt from cathodes of spent lithium-ion batteries. J.Power Sources, 171(2007) p. 953-959.
O. Erdinc, et al., A dynamic lithium-ion battery model considering the effects of temperature and capacity fading, 2009 IEEE, pp. 1-4.
S.Castillo, F.Ansart, C.L.Robert, J.Portal, Advances in the recovering of spent lithium battery compounds. J.Power Sources, 112(2002), pp. 247-254.
Zhu Shu-guang, et al., Recovery of Co and Li from spent lithium-ion batteries by combination method of acid leaching and chemical precipitation; Apr. 10, 2002, pp. 8.
M.Contestabile, S.Panero, B.Scrosati, A laboratory-scale lithium battery recycling process. J.Power Sources, 83 (1999), pp. 75-78.
J.Xu, H.R.Thomas. R.W.Francis, K.R.Lum, J.Wang, B.Liang, A review of processes and technologies for the recycling of lithium-ion secondary batteries. J.Power Sources, 177(2008), pp. 512-527.

* cited by examiner

*Primary Examiner* — Steven Bos
(74) *Attorney, Agent, or Firm* — Chapin IP Law, LLC (57) ABSTRACT

Cathode material from exhausted lithium ion batteries are dissolved in a solution for extracting the useful elements Co (cobalt), Ni (nickel), Mn (manganese), Li (lithium), and Fe (iron) to produce active cathode materials for new batteries. The solution includes compounds of desirable materials such as cobalt, nickel and manganese dissolved as compounds from the exhausted cathode material of spent cells. Depending on a desired proportion, or ratio, of the desired materials, raw materials are added to the solution to achieve the desired ratio of the commingled compounds for the recycled cathode material for new cells. The desired materials precipitate out of solution without extensive heating or separation of the desired materials into individual compounds or elements. The resulting active cathode material has the predetermined ratio for use in new cells, and avoids high heat typically required to separate the useful elements because the desired materials remain commingled in solution.

11 Claims, 5 Drawing Sheets

METHOD AND APPARATUS FOR RECYCLING LITHIUM-ION BATTERIES

RELATED APPLICATIONS

This patent application claims the benefit under 35 U.S.C. §119(e) of U.S. Provisional Patent App. No. 61/620,051, filed Apr. 4, 2012, entitled "FULL CLOSED LOOP FOR RECYCLING LITHIUM ION BATTERIES," incorporated herein by reference in entirety.

BACKGROUND

For decades, portable electrical power supplies have taken the form of batteries that release electrical energy from an electrochemical reaction. Various battery chemistries, such as traditional "dry cell" carbon flashlight batteries, and lead acid "wet" cells common in automobiles have provided adequate portable electrical power. Modern electronics, however, place significantly greater demands on the longevity and mass of batteries. Battery power has traditionally come at a premium of the mass required for the charge material for generating sufficient current. Conventional flashlight batteries deliver only low current. Automobile batteries for delivering an intense but brief high amperage flow to a starter motor are very dense and large. Modern electronic devices, such as cell phones, computing devices, and automobiles, demand substantial current delivery while being lightweight and small enough to avoid hindering the portability of the host device.

Rechargeable nickel-cadmium (NiCad) and nickel metal hydride (NiMH) had gained popularity for rechargeable batteries for portable devices. Recently, however, advances in lithium-ion batteries (LIBs) have been significant such that that they have become the most popular power source for portable electronics equipment, and are also growing in popularity for military, electric vehicle, and aerospace applications. Continuing development of personnel electronics, hybrid and electric vehicles, ensures that Li-ion batteries will continue to be increasingly in demand.

SUMMARY

Exhausted LIBs undergo a physical separation process for removing solid battery components, such as casing and electrodes, and are dissolved in a solution for extracting the useful elements Co (cobalt), Ni (nickel), Mn (manganese), Li (lithium), and Fe (iron) from mixed cathode materials and utilizing the recycled elements to produce active materials for new batteries. The solution includes compounds of desirable materials such as cobalt, nickel and manganese dissolved as compounds from the exhausted cathode material of spent cells. Depending on a desired proportion, or ratio, of the desired materials, raw materials are added to the solution to achieve the desired ratio of the commingled compounds for the recycled cathode material for new cells. A strong base, such as sodium hydroxide, raises the pH such that the desired materials precipitate out of solution without extensive heating or separation of the desired materials into individual compounds or elements. The resulting active cathode material has the predetermined ratio for use in new cells, and avoids high heat typically required to separate the useful elements because the desired materials remain commingled in solution and undergo only a change in concentration (ratio) by adding small amounts of pure charge material to achieve a target composition.

Lithium-ion batteries, like their NiCad (nickel-cadmium) and NiMH (nickel-metal hydride) predecessors, have a finite number of charge cycles. It is therefore expected that LIBs will become a significant component of the solid waste stream, as numerous electric vehicles reach the end of their lifespan. Recycling of the charge material in the lithium batteries both reduces waste volume and yields active charge material for new batteries.

Recycling can dramatically reduce the required lithium amount. Various chemicals in lithium ion batteries include valuable metals such as cobalt, manganese, iron, and nickel. Additionally, battery disposal would require that fresh metals be mined for cathode material, and mining has a much bigger environmental impact and cost than simple recycling would. In short, recycling of lithium ion batteries not only protects the environment and saves energy, but also presents a lucrative outlet for battery manufacturers by providing an inexpensive supply of active cathode material for new batteries.

Current recycling procedures for $LiCoO_2$ cells are generally focused on $LiCoO_2$ cathode materials. Although some posted their methods to recycle more kinds of cathode materials, all are complex and not necessarily economical or practical. A simple methodology with high efficiency is proposed in order to recycle Li-ion batteries economically and with industrial viability. The disclosed approach results in synthesis of cathode materials (particularly valuable in Li-ion batteries) from recycled components. In contrast to conventional approaches, the disclosed approach does not separate Ni, Mn, and Co out. Instead, uniform-phase precipitation is employed as starting materials to synthesize the cathode materials as active charge material suitable for new batteries. The analytical results showed that the recycling process is practical and has high recovery efficiency, and has commercial value as well.

Configurations herein are based, in part, on the observation that the increasing popularity of lithium ion cells as a source of portable electric power will result in a corresponding increase in spent lithium-based cathode material as the deployed cells reach the end of their useful lifetime. While 97% of lead acid batteries are recycled, such that over 50 percent of the lead supply comes from recycled batteries, lithium ion batteries are not yet being recycled widely. While the projected increase of lithium demand is substantial, analysis of Lithium's geological resource base shows that there is insufficient lithium available in the Earth's crust to sustain electric vehicle manufacture in the volumes required, based solely on Li-ion batteries. Recycling can dramatically reduce the required lithium amount. A recycling infrastructure will ease concerns that the adoption of vehicles that use lithium-ion batteries could lead to a shortage of lithium carbonate and a dependence on countries rich in the supply of global lithium reserves.

Unfortunately, conventional approaches to the above approaches suffer from the shortcoming that recycling approaches include high temperature processes to separate the compounds of the desirable materials of cobalt, manganese, nickel and lithium. This high-temperature process results in breaking down the compounds for separation, but only to recombine them again for new recycled, active material. The high temperature approach therefore requires substantial energy, expense, and processing for separating and recombining the desirable materials.

Accordingly, configurations herein substantially overcome the above described shortcoming of heat intensive component separation described above by generating a low temperature solution of the desired compounds that is mixed with small amounts of additional pure forms of the desirable materials to achieve a target ratio of the desired active charge materials. The desirable materials are extracted by precipitation to result in recycled active cathode material without separating or breaking down the compounds, allowing a lower temperature and less expensive process to generate the active cathode materials.

In the approach disclosed below, a method of recycling Li-ion batteries therefore includes generating a solution of aggregate battery materials from spent cells, and precipitating mixtures from the generated solution. A recycler apparatus adjusts the solution to achieve a predetermined ratio of desirable materials, and precipitating the desirable material in the predetermined ratio to form cathode material for a new battery having the predetermined ratio of the desirable materials. It should be noted that although the methods and apparatus disclosed herein employ Li-ion batteries as an example, the principles are intended as illustrative and could be applied to other types of cathode materials suited to other battery chemistries.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
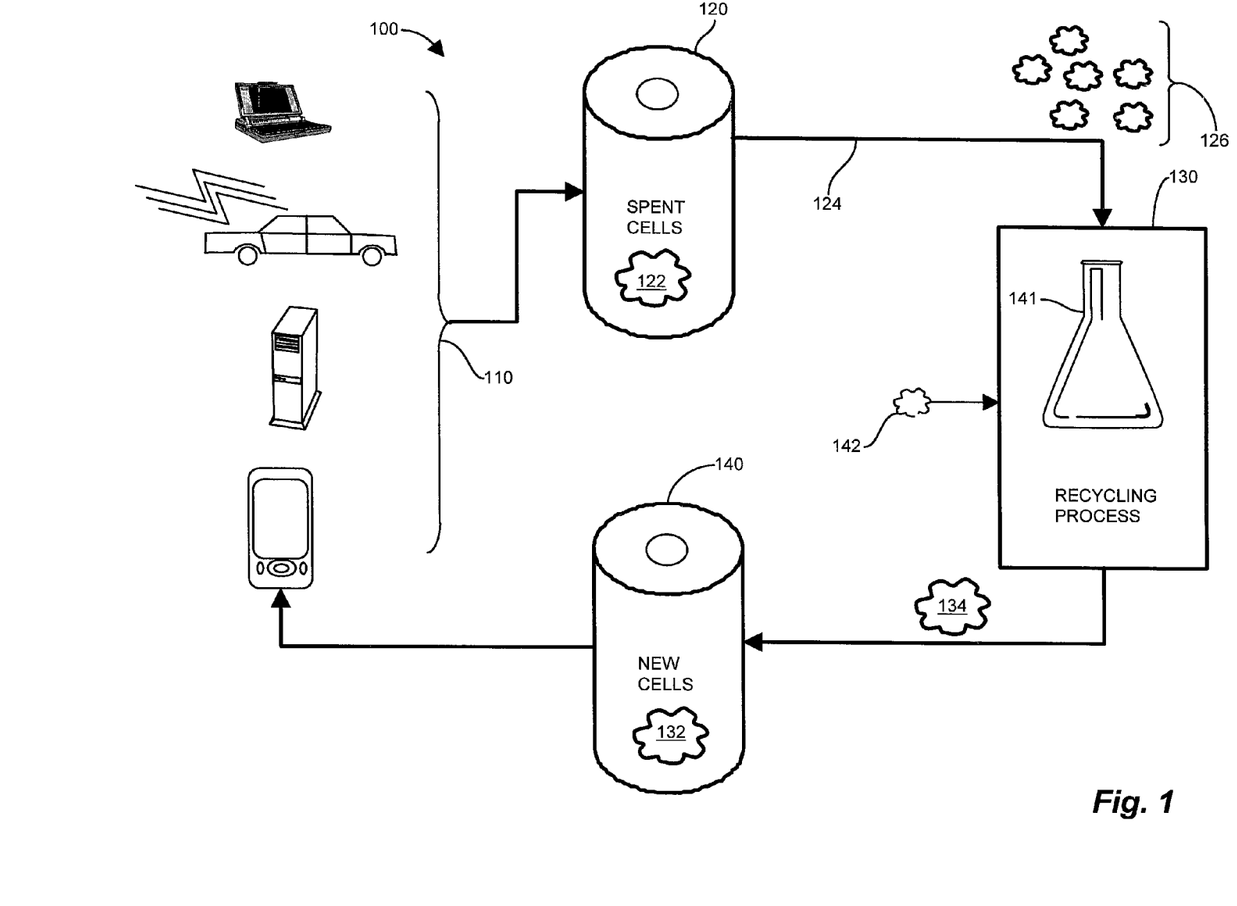
FIG. 1 is a context diagram of a battery recycling environment suitable for use with configurations herein.

Depicted below is an example method and apparatus for recycling batteries such as lithium ion batteries. The proposed approach is an example and is applicable to other lithium and non-lithium batteries for recycling spent batteries and recovering active cathode material suitable for use in new batteries. FIG. 1 is a context diagram of a battery recycling environment 100 suitable for use with configurations herein. Referring to FIG. 1, in the battery recycling environment 100, electronic devices 110 such as laptops, automobiles (hybrid and pure electric), computers, smartphones, and any other type of battery supported equipment is suitable for use with the disclosed approach. The electronic devices contribute spent cells 120, having spent cathode material 122 that nonetheless includes the raw materials responsive to the recycling approach discussed herein. A physical separation process 124 dismantles the battery to form a granular mass 126 of the exhausted battery material including the raw materials in particulate form, usually by simply crushing and grinding the spent battery casings and cells therein.

Physical separation is applied to remove the battery cases (plastic) and electrode materials, often via magnetic separation that draws out the conductive metals. A recycler 130 includes physical containment of a solution 141 including the remaining granular mass 126 including the spent charge materials. Additional raw charge materials 142 are added to achieve a predetermined ratio of the desirable materials in the solution 141. Following the recycling process, as discussed further below, cathode materials 134 result and are employed to form a new battery 140 including the recycled cathode material 132. The new battery 140 may then be employed in the various types of devices 110 that contributed the exhausted, spent cells 120. The recycler may include an apparatus for containing the solution 141 such that a pH adjuster or modifier and raw materials may be added to the solution 141.

Figure 2:
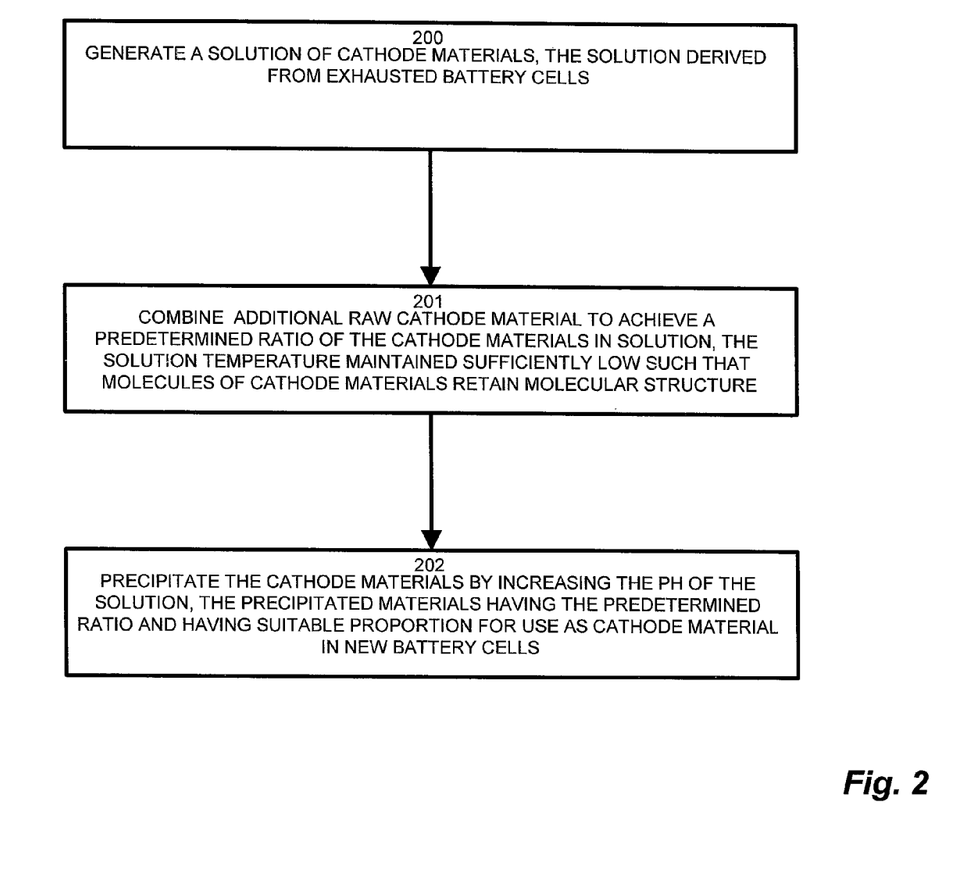
FIG. 2 is a flowchart of lithium battery recycling in the environment of FIG. 1.

FIG. 2 is a flowchart of lithium battery recycling in the environment of FIG. 1. Referring to FIGS. 1 and 2, the method of recycling spent cathode material 122 as disclosed herein includes generating a solution 141 of cathode materials derived from exhausted battery cells 120, as depicted at step 200. The method combines additional raw cathode material 142 to achieve a predetermined ratio of the cathode materials in solution 141, and is such that the solution temperature is maintained sufficiently low such that molecules of cathode materials retain molecular structure. In contrast to conventional approaches, the solution is not heated to the point of decomposing the compounds into their constituent molecules for collection and further synthesis. The solution 141 precipitates the cathode materials 134 by increasing the pH of the solution 141, such that the cathode materials 134 have the predetermined ratio and have suitable proportion for use as the cathode material 132 in the new battery 140. In the example configuration, the desirable materials include manganese (Mn), cobalt (Co), and nickel (Ni) extracted from cathode material of battery cells. In the solution 141, the desirable materials remain commingled during precipitation such that the resulting cathode materials 134 have the correct proportion for usage in the new battery 140.

Figure 3:
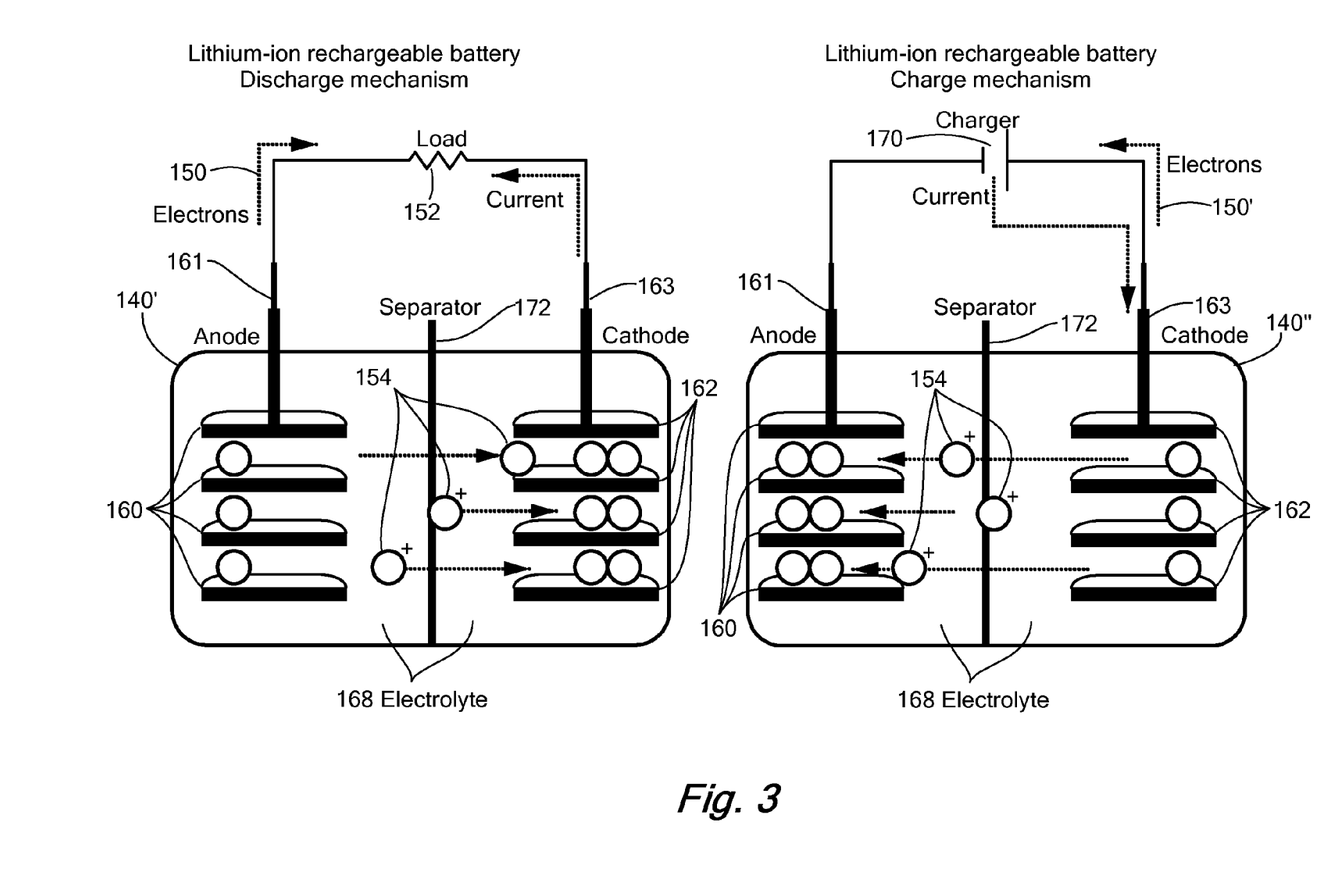
FIG. 3 is a diagram of charge flow (electrons) during charging and discharging of the batteries of FIG. 1.

FIG. 3 is a diagram of charge flow (electrons) during charging and discharging of the batteries of FIG. 1. Batteries in general produce an electron flow via an electrochemical reaction that causes an electrical current from the electron flow to provide the electrical power, coupled with a corresponding flow of ions in the battery between an anode and cathode. Referring to FIGS. 1 and 3, a lithium-ion battery (LIB) 140' generates a negative electron flow 150 to power an electrical load 152 in a reversible manner (for recharge), similar to other rechargeable batteries. During charging, a charger 170 provides a voltage source that causes the electron flow 151' to reverse. Lithium ions 154 move from the negative electrode 160 to the positive electrode 162 during discharge, and back when charging. An anode tab 161 electrically connects the negative electrodes 160 for connection to the load 152/charger 170, and a cathode tab 163 connects the positive electrodes 162. An electrolyte 168 surrounds the electrodes for facilitating ion 154 transfer. A separator prevents contact between the anode 160 and cathode 162 to allow ionic transfer via the electrolyte 168 so that the anode and cathode plates do not "short out" from contact. The positive electrode 162 half-reaction (cathode reaction), using $LiCoO_2$ as an example:

$$LiCoO_2 \rightleftharpoons Li_{1-x}CoO_2 + xLi + xe^-$$

The negative electrode 160 half-reaction is:

$$xLi^+ + xe^- + 6C \rightleftharpoons Li_xC_6$$

Overall cell reaction:

$$C + LiCoO_2 \rightleftharpoons Li_xC + Li_{1-x}CoO_2$$

During charging, the transition metal cobalt is oxidized from $Co^{3+}$ to $Co^{4+}$, and reduced from $Co^{4+}$ to $Co^{3+}$ during discharge.

Figure 4:
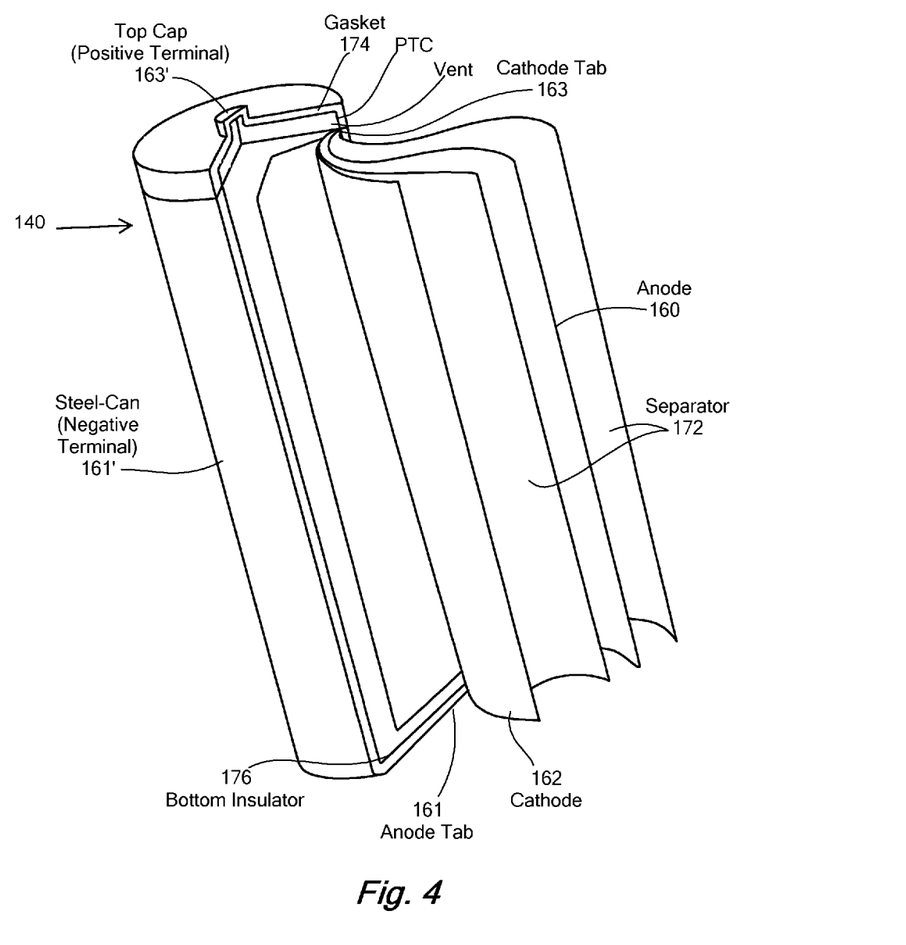
FIG. 4 is a diagram of battery structure of the batteries of FIG. 1.

FIG. 4 is a diagram of battery structure of the batteries of FIG. 1. Referring to FIGS. 3 and 4, the physical structure of the battery 140 is a cylinder encapsulation of rolled sheets defining the negative electrode 160 and the positive electrode 162

Primary functional parts of the new battery 140 are the anode 160, cathode, 162 electrolyte 168, and separator 172. LIBs use an intercalated lithium compound as the electrode material. The most commercially popular anode 160 (negative) electrode material contains graphite, carbon and PVDF (polyvinylidene fluoride) binder, coated on copper foil. The cathode 162 (positive) electrode contains cathode material, carbon, and PVDF binder, coated on aluminum foil. The cathode 162 material is generally one of three kinds of materials: a layered oxide (such as lithium cobalt or nickel oxide), a polyanion (such as lithium iron phosphate), or a spinel (such as lithium manganese oxide), and defines the spent cathode material 122 and recycled cathode material 132 as disclosed herein. Alternatively, the disclosed approach for recycling cathode material may be applied to other materials in various battery components, such as anodic and electrolyte components. The electrolyte 168 is typically a mixture of organic carbonates and generally use non-coordinating anion salts such as lithium hexafluorophosphate ($LiPF_6$). The electrolyte 168 acts as an ionic path between electrodes and separates the two electrode materials. The outside metal casing defines the negative terminal 161', coupled to the anode tab 161, and the top cap 163' connects to the cathode tab 163. A gasket 174 and bottom insulator 176 maintains electrical separation between the polarized components.

The electrodes are cast on foils using the PVDF binder, and cannot be separated easily by physical processes. By immersing in a suitable solvent, the binder re-dissolves such that the electrode particles separate from the copper and aluminum current collector. NMP (N-methy-2-pyrrolidone), is an effective solvent (solubility around 200 g/kg of solvent) for PVDF, has a boiling point about 200° C., and which dissolves substantially all the binder at 70° C. In contrast, for acetone, the separation efficiency is acceptable but with the increase of temperature, acetone evaporates rapidly. Thus, the cell pieces are immersed in the solvent NMP, which is stirred, heated to around 70° C. The electrode particles are filtered from the solution to recover valuable metals, while the solution can be reused to dissolve the binder. This treatment achieves effective separation and recovery of both copper and aluminum in their metallic form by simply filtering them out from the NMP solution. After adequate cleaning, the two metals can be directly reused.

Conventional approaches for recycling focus on $LiCoO_2$ in spent LIBs. However, with the development of lithium ion battery technologies, different cathode materials are now being used to produce lithium ion batteries such as $LiFePO_4$, $LiNiO_2$, $LiMnO_2$, and $LiNi_{1/3}Mn_{1/3}Co_{1/3}O_2$. It can be complex to sort out lithium ion batteries based on the battery chemistry and conventional methods cannot effectively recycle lithium ion batteries with different chemistries because different procedures are required to separate the respective compounds for reuse as active cathode material.

The cathode materials widely used in commercial lithium ion batteries include $LiCoO_2$, $LiMn_2O_4$, $LiNiO_2$, $LiNi_{1/3}Mn_{1/3}Co_{1/3}O_2$ and $LiFePO_4$. In order to recycle lithium ion batteries effectively, it is beneficial to consider all the various battery chemistries. Thus, it is important to develop a simple and environmentally acceptable recycling process generally applicable to various LIBs used widely. Configurations disclosed herein present an example to extract compounds including the desirable elements of Co, Ni, Mn, Li and Fe from mixed cathode materials and utilize the recycled materials to produce active materials for batteries. Batteries of alternate chemistries may be recycled using the methods disclosed.

Figure 5:
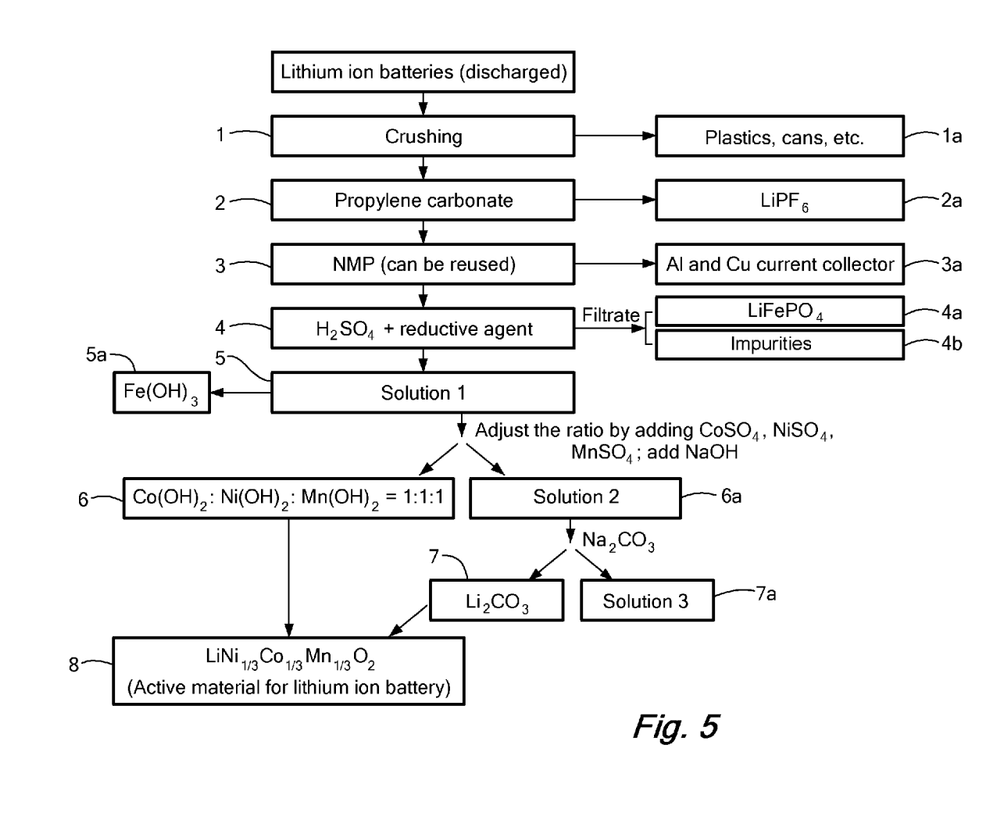
FIG. 5 is a diagram of recycling the cathode material in the battery of FIG. 4.

FIG. 5 is a diagram of recycling the cathode material in the battery of FIG. 4. Referring to FIGS. 1, 4 and 5, at step 1 discharged Li ion batteries 120 are crushed/shredded. Mechanical separation processes are applied as a pretreatment to treat the outer cases and shells and the metallic fraction will be conducted to a hydrometallurgical or similar process, thus removing extraneous materials not part of the desirable cathode materials, as shown at step 1a.

Thus, at step 2, electrode and electrolyte will be soaked into propylene carbonate (PC) to recycle the salt (mainly $LiPF_6$) in the electrolyte since $LiPF_6$ has a high solubility in PC, which can be evaporated to obtain $LiPF_6$. $LiPF_6$ can be used to make new electrolyte, as depicted at step 2a. Undissolved materials including electrode and current collectors will be filtered. The cell pieces are immersed in N-methy-2-pyrrolidone (NMP) solution at about 70° C. to separate the electrode particles from the residual current collector, as shown at step 3. This removes the solid metal conductor elements not needed for the recycling, as shown at step 3a.

The electrode particles are filtered from the binder solution, and then leached by enough 4M sulfuric acid and 29-32% hydrogen peroxide for about 2-3 hours at 70-80° C., as depicted at step 4. Addition of hydrogen peroxide $H_2O_2$ changes not only Fe2+ to Fe3+, but also other metal ions Mn, Ni, Co to 2+, and involves controlling pH to separate iron from other metal ions in the solution. After filtration, residual LiFeO4 and carbon can be separated by centrifugation, as shown at step 4a. Other impurities are also removed from the surface of the solution, as shown at step 4b. Therefore, the manner of separating iron includes two steps: control the valence of metal ions and then control pH.

The metallic elements of interest are transferred to the aqueous solution as the crushed raw cathode materials form a granular mass 126 in the solution of aggregate battery materials from the spent cells, as depicted at step 5. This includes the desirable materials of Co (cobalt), Ni (nickel), Mn (manganese), Li (lithium), and Fe (iron) in the example shown. Other desirable materials may be employed using the present approach with alternate battery chemistries. The pH is adjusted to extract $Fe(OH)_3$, followed by adding hydrogen peroxide to precipitate the iron, removing the iron and subsequently adding sodium hydroxide for raising the pH. This involves adjusting the pH to a range between 3-5. Accordingly, NaOH solution is added to adjust pH to deposit $Fe(OH)_3$ which has a lower solubility constant, and keep $Mn^{2+}$, $Co^{2+}$, $Ni^{2+}$ in the solution, then $Fe(OH)_3$ is recovered by filtration. It should be noted that the above processes include maintaining the solution 141 at a temperature between 40 deg. C. and 80 deg. C., thus avoiding high heat required in conventional approaches.

The desirable materials are now dissolved in the solution 141. Based on the predetermined target ratio of the desirable materials, the solution is adjusted to achieve the predetermined ratio of desirable materials. In the example approach, this is a 1:1:1 combination of cobalt, manganese and nickel, although any suitable ratio could be employed. Therefore, adjusting the solution includes identifying a desired ratio of the desirable materials for use in recycled cathode material resulting from the generated solution 141, and adding raw materials 142 to achieve the desired ratio, such that the raw materials include additional quantities of the desirable materials and subsequently adding the new raw materials to attain the predetermined ratio. Adding the raw materials includes adding additional quantities of the desirable materials for achieving the desired ratio without separating the individual desirable materials already in solution form, therefore the mixed desirable materials (Co, Mn, Ni) do not need to be separately drawn or extracted as in conventional approaches, which usually involve high heat to break the molecular bonds of the compounds. Furthermore, in an alternate configuration, selected metallic elements can be separated from the solution, which can be used to synthesize particular cathode materials. Therefore, the pH may be adjusted to extract one or more metal ions or other elements prior to adjusting the solution for the predetermined ratio of desirable materials, and for subsequent extracting the remaining desirable materials in the predetermined ratio.

Rather, the concentration of $Mn^{2+}$, $Co^{2+}$, $Ni^{2+}$ in the solution is tested, and adjusted for a ratio of 1:1:1 with additional $CoSO_4$, $NiSO_4$, $MnSO_4$. NaOH solution is added to increase the pH to around 11, usually within a range of 10.5-13, thus adjusting a pH of the solution such that the desirable materials precipitate. $Co(OH)_2$, $Ni(OH)_2$, $Mn(OH)_2$ can be coprecipitated such that the respective mole ratio is 1:1:1, as depicted at step 6. A second solution (solution 2) is formed using distilled water, as depicted at step 6a, discussed in step 7 below. The added raw materials 142 are expected to be substantially pure forms, however this represents a much smaller quantity of refined materials than would be required for forming the new battery 140 without the inclusion of the spent cathode material 122.

In the example arrangement, the desirable materials include manganese (Mn), cobalt (Co), and nickel (Ni) extracted from spent cathode material 122 of the spent battery cells 120, in which the desirable materials remain commingled in the solution 141 during precipitation. Adjusting the pH includes adding a substance, such as NaOH (sodium hydroxide) for raising the pH such that the desirable materials precipitate, however any suitable substance for raising the pH may be employed. The end result is that adjusting the pH includes adding sodium hydroxide for raising the pH to permit precipitation of the desirable materials for use as cathode material without separately precipitating the individual compounds defining the desirable materials. The precipitation of the desirable materials occurs at temperatures below 80 deg. C., avoiding high heat required in conventional approaches. It should be further noted that, in contrast to conventional approaches, the desirable materials remain commingled during precipitation.

$Na_2CO_3$ is added in the solution to deposit $Li_2CO_3$ from solution 3 at about 40° C. After filtering, $Li_2CO_3$ can be recycled as the starting material to synthesize the active cathode material $LiNi_{1/3}Mn_{1/3}Co_{1/3}O_2$, as shown at steps 7 and 7a. Therefore, the method adds back the lithium to the precipitated desirable materials to form active cathode material suitable for the new battery, and precipitates the desirable material in the predetermined ratio to form charge material for a new battery 140 having the predetermined ratio of the desirable materials.

The coprecipitated materials $Co(OH)_2$, $Mn(OH)_2$, $Ni(OH)_2$ and recovered $Li_2CO_3$, with additional $Li_2CO_3$ in molar ratio 1:1 of Li versus M (M=$Ni_{1/3}Mn_{1/3}Co_{1/3}$), are mixed and ground in mortar, as depicted at step 8. The precursor is subject to ball-milling for 48 hours and pressed into pellets (Pressure=15000 lbs, 12.96 mm diameter). In each step the method maintains a temperature of the solution sufficiently low to maintain a structure of the cathode material compounds.

Following the precipitation, the pressed pellets may be reformulated by any suitable processing to form the cathode material 134 for a new battery 140. In the example approach, the pressed pellets were sintered at 900° C. for 15 hours. The reaction product may be ground into powder for subsequent distribution and reformation into a new battery 140. The $LiNi_{1/3}Mn_{1/3}Co_{1/3}O_2$ is sintered by a high temperature solid-state method at 900° C. for 15 hours.

In further detail, as disclosed in the corresponding provisional application cited above, the details of a particular implementation of the method as disclosed and claimed herein includes the following steps:

Step 1: Discharged Li ion batteries are crushed/shredded. Mechanical separation processes are applied as a pretreatment to treat the outer cases and shells.

Step 2: Electrode and electrolyte are soaked into propylene carbonate (PC) to recycle the salt (mainly $LiPF_6$) in the electrolyte, since $LiPF_6$ has a high solubility in PC, which can be evaporated to obtain $LiPF_6$ used to make new electrolyte. Undissolved materials including electrode and current collectors are filtered.

Step 3: The cell pieces are immersed in the NMP at about 70° C. to separate the electrode particles from the residual current collector.

Step 4: The electrode particles are filtered from the binder solution, and then leached by sufficient 4M sulfuric acid and 29-32% hydrogen peroxide for about 2-3 hours at 70-80° C. After filtration, residual $LiFeO_4$ and carbon can be separated by centrifugation.

Step 5: NaOH is added to adjust pH to deposit $Fe(OH)_3$ which has a lower solubility constant, and to maintain $Mn^{2+}$, $Co^{2+}$, $Ni^{2+}$ in solution 1. $Fe(OH)_3$ is recovered by filtration at step 5a.

Step 6: The concentration of $Mn^{2+}$, $Co^{2+}$, $Ni^{2+}$ in the solution is tested. The ratio is adjusted to 1:1:1 with additional $CoSO_4$, $NiSO_4$, $MnSO_4$, and stirred for 2 hours. NaOH is added to increase the pH to 11, which fully coprecipitates $Co(OH)_2$, $Ni(OH)_2$, $Mn(OH)_2$ at a mole ratio of 1:1:1.

Step 7: $Na_2CO_3$ is added in the solution to deposit $Li_2CO_3$ at about 40° C. After filtering, $Li_2CO_3$ can be recycled as the starting material to synthesize the active cathode material $LiNi_{1/3}Mn_{1/3}Co_{1/3}O_2$.

Step 8: The coprecipitate materials of $Co(OH)_2$, $Mn(OH)_2$, and $Ni(OH)_2$, and recovered $Li_2CO_3$ with additional $Li_2CO_3$ in molar ratio 1:1 of Li versus M (M=$Ni_{1/3}Mn_{1/3}Co_{1/3}$) are mixed and ground in a mortar. The precursor is ball milled for 48 hours and pressed into pellets (Pressure=15000 lbs, 12.96 mm diameter). The pellets are sintered at 900° C. for 15 hr in air at an increasing temperature rate of 9° C./min from room temperature. The reaction product is ground into powder using a mortar and pestle. The $LiNi_{1/3}Mn_{1/3}Co_{1/3}O_2$ are sintered by high temperature at 900° C. for 15 hours.

Characterization and Analysis:

The recycled products $Li_2CO_3$ and sintered $LiNi_{1/3}Mn_{1/3}Co_{1/3}O_2$ were characterized by X-ray diffraction (XRD) using an X-ray diffractometer with copper $K_\alpha$ radiation (Cu target: S/N 07/03-1120).

The concentration of metals in solution was tested by atomic absorption spectroscopy (Perkin-Elmer AA Analyst 300). The scan electron microscope (SEM) images and energy disperse spectroscopy (EDS) results were obtained by JEOL JSM-7000F electron microscope.

The pH of solution was tested by pH meter-Milwaukee MW102. The resolution is about 0.01 pH, and its range is from −2.00 to 16.00 pH.

Based on the above process and findings, it is apparent that lithium carbonate recovered from spent LIBs can be used as precursors to synthesize $LiNi_{1/3}Mn_{1/3}Co_{1/3}O_2$.

Compared to $LiCoO_2$, $LiNi_{1/3}Mn_{1/3}Co_{1/3}O_2$ combines lower cost as well as greater safety and performance. When charged to 4.6 V and then discharged to 2.5 V, the specific capacity can reach 200 $mAhg^{-1}$, which exceeds $LiCoO_2$ without sacrificing cycle life. There is also much less heat flow and higher onset temperature than $LiCoO_2$. Therefore, homogeneous precursors as disclosed herein not only accelerate the formation of $LiNi_{1/3}Mn_{1/3}Co_{1/3}O_2$, but also significantly improve the electrochemical performances.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of recycling batteries comprising:
   removing solid battery components including casing and electrode materials from exhausted lithium ion batteries (LIBs) by physical separation resulting in a granular mass of spent charge materials including manganese, cobalt, and nickel;
   combining sulfuric acid and hydrogen peroxide with the granular mass to obtain a solution having a pH in the range of 3-5 to precipitate impurities including $Fe(OH)_3$;
   adding $NiSO_4$, $MnSO_4$, $CoSO_4$ to the solution; and
   adding a strong base to the solution to coprecipitate hydroxides of Ni, Mn and Co for a cathode material precursor.

2. The method of claim 1 further comprising maintaining a temperature of the solution sufficiently low to maintain a structure of the cathode material precursor for the recycled battery.

3. The method of claim 1 wherein adding the $CoSO_4$, $NiSO_4$, $MnSO_4$ includes adding quantities of the $CoSO_4$, $NiSO_4$, $MnSO_4$ without separately precipitating the Mn, Co, Ni present in the solution.

4. The method of claim 1 wherein adjusting the pH includes adding sodium hydroxide to the solution for raising the pH to permit precipitation of hydroxides including Ni, Mn and Co, for use as cathode material.

5. The method of claim 3 wherein substantially pure forms of the $CoSO_4$, $NiSO_4$, $MnSO_4$ are added.

6. The method of claim 1 wherein coprecipitation of the hydroxides of Ni, Mn and Co occurs at temperatures below 80 degrees C.

7. The method of claim 1 wherein the hydroxides of Mn, Co, Ni are in a 1:1 molar ratio of Li to $Ni_{1/3}Mn_{1/3}Co_{1/3}$.

8. The method of claim 1 wherein sintering the hydroxides of Ni, Mn and Co with lithium carbonate results in $LiNi_{1/3}Mn_{1/3}Co_{1/3}O_2$.

9. The method of claim 1, wherein the strong base raises the pH of the solution to a range between 10.5-13.0.

10. The method of claim 1 further comprising sintering the cathode material precursor with lithium carbonate to obtain charge material for the recycled battery.

11. In a battery recycling environment having exhausted lithium ion batteries for recycling into charge material for recycled batteries, the exhausted lithium ion batteries having charge materials including at least nickel, manganese and cobalt, a method for forming a charge material precursor for a recycled battery, the method comprising:
    removing solid battery components including casing and electrode materials from exhausted lithium ion batteries by physical separation resulting in a granular mass of spent charge materials;
    combining sulfuric acid and hydrogen peroxide with the granular mass to obtain a solution having a pH in the range of 3-5 to precipitate impurities including $Fe(OH)_3$;
    adding $NiSO_4$, $MnSO_4$, $CoSO_4$; and
    adding sodium hydroxide to the solution to coprecipitate a cathode material precursor in the form of hydroxides of Co, Ni and Mn by raising the pH to a range between 10.5-13.0; and
    sintering the cathode material precursor with lithium carbonate to obtain cathode material.

* * * * *